US012700997B2

(12) United States Patent
Chen et al.

(10) Patent No.: US 12,700,997 B2
(45) Date of Patent: Aug. 4, 2026

(54) CRYPTOGRAPHIC DEVICE USING TRANSPOSITION FUNCTION AND/OR MAPPING FUNCTION AND CRYPTOGRAPHIC METHOD THEREOF

(71) Applicant: Nuvoton Technology Corporation, Hsinchu Science Park (TW)

(72) Inventors: Shun-Hsiung Chen, Hsinchu Science Park (TW); Kun-Yi Wu, Tainan City (TW); Yu-Shan Li, Tainan City (TW)

(73) Assignee: Nuvoton Technology Corporation, Hsinchu Science Park (TW)

( * ) Notice: Subject to any disclaimer, the term of this patent is extended or adjusted under 35 U.S.C. 154(b) by 256 days.

(21) Appl. No.: 18/325,447

(22) Filed: May 30, 2023

(65) Prior Publication Data
US 2024/0007283 A1 Jan. 4, 2024

(30) Foreign Application Priority Data
Jun. 30, 2022 (TW) ................................. 111124611

(51) Int. Cl.
*H04L 9/08* (2006.01)

(52) U.S. Cl.
CPC ................................. *H04L 9/0869* (2013.01)

(58) Field of Classification Search
CPC ...................................................... H04L 9/0869
See application file for complete search history.

(56) References Cited

U.S. PATENT DOCUMENTS

| | | | | |
|---|---|---|---|---|
| 2003/0223580 | A1* | 12/2003 | Snell | H04L 9/0631 |
| | | | | 380/28 |
| 2004/0025032 | A1* | 2/2004 | Chow | H04L 9/0625 |
| | | | | 713/189 |
| 2016/0306750 | A1* | 10/2016 | Tucker | H04L 9/0869 |
| 2023/0344625 | A1* | 10/2023 | Macchetti | H04L 9/0866 |

FOREIGN PATENT DOCUMENTS

| | | |
|---|---|---|
| CN | 107085545 A | 8/2017 |
| CN | 112149145 A | 12/2020 |
| CN | 112149151 A | 12/2020 |
| JP | 2014186180 A | 10/2014 |
| TW | 201719489 A | 6/2017 |
| TW | 202027075 A | 7/2020 |
| TW | 202141285 A | 11/2021 |

OTHER PUBLICATIONS

An Office Action dated May 23, 2026 issued in corresponding Chinese Patent Application No. 202211463236.X, 8 pages.

* cited by examiner

*Primary Examiner* — Nam T Tran

(74) *Attorney, Agent, or Firm* — MUNCY, GEISSLER, OLDS & LOWE, P.C.

(57) ABSTRACT

A cryptographic device for a memory device includes a determination unit, a mapping unit, and a cryptographic unit. The determination unit determines that a memory address is in a protection area to select a key and a random number. The mapping unit maps a binary code to an injection code according to the key and the memory address, in which the binary code includes the random number and the memory address. The cryptographic unit generates a key stream according to the key and the injection code.

9 Claims, 13 Drawing Sheets

1700

```
                    ( Start )
                        │
                        ▼         S110
              ╱ Determining ╲
            ╱ whether the received memory ╲   No
           ╱ address ADDR is located in the ╲────┐
            ╲    protection area    ╱            │
              ╲               ╱                  │
                   │ Yes                         │
                   ▼                             │
   ┌──────────────────────────────────┐         │
   │ Selecting the key and the random number │──S120  │
   └──────────────────────────────────┘         │
                   │                             │
                   ▼                             │
   ┌──────────────────────────────────┐         │
   │      Generating a binary code      │──S130  │
   └──────────────────────────────────┘         │
                   │                             │
                   ▼                             │
   ┌──────────────────────────────────┐         │
   │ Generating the operation code according to the │──S140 │
   │ key, the memory address and the binary code │       │
   └──────────────────────────────────┘         │
                   │                             │
                   ▼                             │
   ┌──────────────────────────────────┐         │
   │ Generating a key stream based on the key │──S150 │
   │      and the operation code       │        │
   └──────────────────────────────────┘         │
                   │                             │
                   ▼◄────────────────────────────┘
                 ( End )
```

| memory address ADDR | key KEY | random number NONCE |
|---|---|---|
| ADDR1 (SADDR1, EADDR1) | KEY1 | NONCE1 |
| ADDR2 (SADDR2, EADDR2) | KEY2 | NONCE2 |
| ⋮ | | |
| ADDRN (SADDRN, EADDRN) | KEYN | NONCEN |

CRA[127:0] ={CB[(x-1):0], CB[127:x]}

CB[127:0]

CB[127:96]    CB[31:0]

CB[95:64]    CB[63:32]

600

CRA[127:0] ={CB[95:64], CB[31:0], CB[127:96}, CB[63:32}}

700

CRYPTOGRAPHIC DEVICE USING TRANSPOSITION FUNCTION AND/OR MAPPING FUNCTION AND CRYPTOGRAPHIC METHOD THEREOF

CROSS REFERENCE TO RELATED APPLICATIONS

This application claims priority of Taiwan Patent Application No. 111124611, filed on Jun. 30, 2022, the entirety of which is incorporated by reference herein.

BACKGROUND OF THE INVENTION

Field of the Invention

The present invention relates to a cryptographic device and a cryptographic method thereof, and more particularly it is related to a cryptographic device using transposition functions and/or mapping functions and a cryptographic method thereof.

Description of the Related Art

In cryptography, the term encryption refers to the process of changing plaintext into incomprehensible ciphertext to protect its contents. Only a device with a decryption method can restore the ciphertext to normal readable content through the decryption process. Ideally, only authorized personnel can read the information that the ciphertext is intended to convey. Encryption by itself cannot prevent the interception of information during transmission, but it can prevent the interceptor from understanding the content of the information.

BRIEF SUMMARY OF THE INVENTION

The present invention provides a cryptographic device and a cryptographic method thereof, which are configured to generate a key stream in real time when the memory control device operates the memory array. Compared with the counter encryption mode, the encryption device and encryption method proposed by the present invention utilize different input data encoding methods, so that the attacker will face higher difficulties in establishing the power analysis module, thereby providing better data protection capability.

In an embodiment, a cryptographic device for a memory device, comprises a determination unit, a mapping unit, and a cryptographic unit. The determination unit determines that a memory address is located in a protection area to select a key and a random number. The mapping unit maps a binary code to an injection code according to the key and the memory address. The binary code comprises the random number and the memory address. The cryptographic unit generates a key stream according to the key and the injection code.

According to an embodiment of the invention, the memory device comprises a first bus interface, a controller, and a memory array. When the first bus interface receives the memory address and an operation instruction, the first bus interface provides the memory address to the determination unit and provides the operation instruction to the controller, so that the controller reads encrypted read data from the memory array and/or write the write data into the memory array according to the memory address and the operation instruction. When the cryptographic unit generates the key stream, the cryptographic unit simultaneously generates a valid signal, and the controller decrypts the encrypted read data and encrypts the write data using the key stream based on the valid signal.

According to an embodiment of the invention, the cryptographic device further comprises a temporary register, a second bus interface, and a first multiplexer. The temporary register stores the start address and the end address of the memory address of the protection area and the key and the random number corresponding to the memory address of the protection area. The user sets the key and the random number that correspond to the memory address of the protection area stored in the register through the second bus interface. The first multiplexer selects the key and the random number corresponding to the memory address according to a determination signal. When the determination unit determines that the memory address is located in the protection area, the determination unit generates the determination signal.

According to an embodiment of the invention, the mapping unit comprises a selection logic unit, an exclusive OR gate, and a first look-up table. The selection logic unit generates a selection code according to the key and the memory address. The exclusive OR gate performs an exclusive OR operation on the selection code and the binary code to generate a first result. The first look-up table has an injection function. The first look-up table maps the first result to the injection code based on the injection function.

According to an embodiment of the invention, the mapping unit comprises a selection logic unit, a first look-up table, a second look-up table, and an exclusive OR gate. The selection logic unit generates a selection code according to the key and the memory address. The first look-up table has a first injection function. The first look-up table maps the selection code to a first result based on the first injection function. The second look-up table has a second injection function. The second look-up table maps the binary code to a second result based on the second injection function. The exclusive OR gate performs an exclusive OR operation on the first result and the second result to generate the injection code.

According to an embodiment of the invention, the mapping unit comprises a selection logic unit, a first exclusive OR gate, a second exclusive OR gate, a first look-up table, and second look-up table. The selection logic unit generates a selection code according to the key and the memory address. The selection code is divided into a first part and a second part, and the binary code is divided into a third part and a fourth part. The first exclusive OR gate performs an exclusive OR operation on the first part and the third part to generate a first result. The second exclusive OR gate performs the exclusive OR operation on the second part and the fourth part to generate a second result. The first look-up table has a first injection function. The first look-up table maps the first result to a first injection code based on the first injection function. The second look-up table has a second injection function. The second look-up table maps the second result to a second injection code based on the second injection function. The injection code comprises the first injection code and the second injection code.

According to an embodiment of the invention, the selection logic unit performs an addition operation on each bit of the key and the corresponding bit of the memory address to generate the selection code.

According to an embodiment of the invention, the selection logic unit performs an exclusive OR operation on each bit of the key and the corresponding bit of the memory address to generate the selection code.

In an embodiment, a cryptographic device for a memory device comprises a determination unit, a third multiplexer, a transposition unit, a mapping unit, and a cryptographic unit. The determination unit determines that a memory address is located in a protection area to select a key and a random number. The third multiplexer selects either a binary code or an injection code to output as an input code. The binary code comprises the random number and the memory address. The transposition unit transposes the input code to generate a transposition code according to the key and the memory address. The mapping unit maps the transposition code to an injection code according to the key and the memory address. The cryptographic unit generates a key stream according to the key and the injection code.

According to an embodiment of the invention, the transposition unit comprises a plurality of transposition logic units, a selection logic unit, and a second multiplexer. Each of the transposition logic units has a transposition logic and transposes the input code according to the transposition logic to generate the transposition code. The transposition logics corresponding to the transposition logic units are different. The selection logic unit generates a selection code according to the key and the memory address. The second multiplexer outputs the transposition code generated by the corresponding transposition logic unit according to the selection code.

In an embodiment, a cryptographic method for a memory array comprises the following steps: determining that a memory address is located in a protection area to select a key and a random number; generating a binary code, wherein the binary code comprises the random number and the memory address; generating an operation code according to the key, the memory address, and the binary code; and generating a key stream according to the key and the operation code.

According to an embodiment of the invention, the cryptographic method further comprises the following steps: reading encrypted read data from a memory array and/or writing write data into the memory array according to the memory address and an operation instruction; and decrypting the encrypted read data and encrypting the write data using the key stream.

According to an embodiment of the invention, the cryptographic method further comprises the following step: storing the start address and the end address of the memory address of the protection area, the key corresponding to the memory address of the protection area, and the random number in a temporary register. The user sets the key and the random number that correspond to the memory address of the protection area stored in the register through a bus interface. The cryptographic method further comprises the following step: when it is determined that the memory address is located in the protection area, selecting the key and the random number corresponding to the memory address from the register.

According to an embodiment of the invention, the step of generating the operation code according to the key, the memory address and the binary code further comprises the following steps: generating a selection code according to the key and the memory address; performing an exclusive OR operation on the selection code and the binary code to generate a first result; and mapping the first result to the operation code based on an injection function.

According to an embodiment of the invention, the step of generating the injection code according to the key, the memory address and the binary code further comprises the following steps: generating a selection code according to the key and the memory address; mapping the selection code to a first result based on a first injection function; mapping the binary code to a second result based on a second injection function; and performing an exclusive OR operation on the first result and the second result to generate the operation code.

According to an embodiment of the invention, the step of generating the operation code according to the key, the memory address and the binary code further comprises the following steps: generating a selection code according to the key and the memory address; dividing the selection code into a first part and a second part; dividing the binary code into a third part and a fourth part; performing an exclusive OR operation on the first part and the third part to generate a first result; performing the exclusive OR operation on the second part and the fourth part to generate a second result; mapping the first result to a first injection code based on a first injection function; mapping the second result to a second injection code based on a second injection function; and combining the first injection code and the second injection code to generate the operation code.

According to an embodiment of the invention, the step of generating the selection code according to the key and the memory address further comprises the following step: performing an addition operation on each bit of the key and the corresponding bit of the memory address to generate the selection code.

According to an embodiment of the invention, the step of generating the selection code according to the key and the memory address further comprises the following step: performing an exclusive OR operation on each bit of the key and the corresponding bit of the memory address to generate the selection code.

According to an embodiment of the invention, the step of generating the operation code according to the key, the memory address and the binary code further comprises the following steps. A selection code is generated according to the key and the memory address. A transposition logic is selected according to the selection code. Either the binary code or the operation code is selected to output as an input code. The input code is transposed based on the transposition logic to generate a transposition code. The selection code and the transposition code are mapped to the operation code based on an injection function.

According to an embodiment of the invention, the step of generating the operation code according to the key, the memory address, and the binary code further comprises the following steps. A selection code is generated according to the key and the memory address. A transposition logic is selected according to the selection code. Either the binary code or a transposition code is selected to output as an input code. The selection code and the input code are mapped to an injection code based on the injection function. The injection code is transposed to generate the operation code based on the transposition logic.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein:

FIG. 2 shows a mapping table of memory addresses, keys and random numbers in accordance with an embodiment of the present invention;

DETAILED DESCRIPTION OF THE INVENTION

Figure 1:
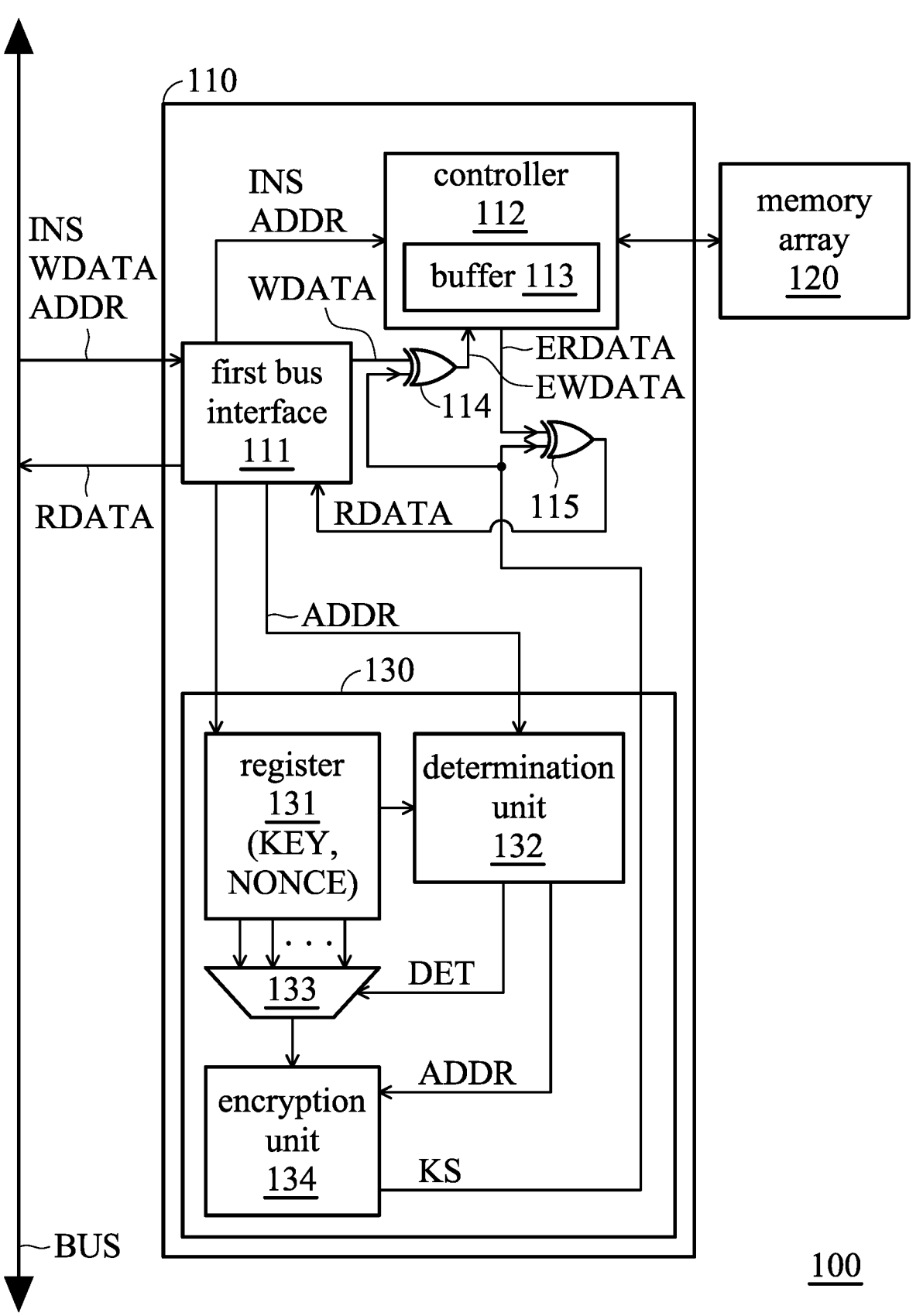
FIG. 1 is a block diagram showing an encryption device in accordance with an embodiment of the present invention.

The following description is made for the purpose of illustrating the general principles of the disclosure and should not be taken in a limiting sense. The scope of the disclosure is determined by reference to the appended claims.

In the following detailed description, for purposes of explanation, numerous specific details and embodiments are set forth in order to provide a thorough understanding of the present disclosure. The use of like and/or corresponding numerals in the drawings of different embodiments does not suggest any correlation between different embodiments.

In addition, in this specification, relative spatial expressions are used. For example, "lower", "bottom", "higher" or "top" are used to describe the position of one element relative to another. It should be appreciated that if a device is flipped upside down, an element that is "lower" will become an element that is "higher".

It should be understood that, although the terms first, second, third etc. may be used herein to describe various elements, components, regions, layers, portions and/or sections, these elements, components, regions, layers, portions and/or sections should not be limited by these terms. These terms are only used to distinguish one element, component, region, layer, portion or section from another element, component, region, layer or section. Thus, a first element, component, region, layer, portion or section in the specification could be termed a second element, component, region, layer, portion or section in the claims without departing from the teachings of the present disclosure.

It should be understood that this description of the exemplary embodiments is intended to be read in connection with the accompanying drawings, which are to be considered part of the entire written description. The drawings are not drawn to scale. In addition, structures and devices are shown schematically in order to simplify the drawing.

The terms "approximately", "about" and "substantially" typically mean a value is within a range of +/−20% of the stated value, more typically a range of +/−10%, +/−5%, +/−3%, +/−2%, +/−1% or +/−0.5% of the stated value. The stated value of the present disclosure is an approximate value. Even there is no specific description, the stated value still includes the meaning of "approximately", "about" or "substantially".

Unless defined otherwise, all technical and scientific terms used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined.

In addition, in some embodiments of the present disclosure, terms concerning attachments, coupling and the like, such as "connected" and "interconnected," refer to a relationship wherein structures are secured or attached to one another either directly or indirectly (for example, electrically connection) via intervening structures, as well as both movable or rigid attachments or relationships, unless expressly described otherwise.

FIG. 1 is a block diagram showing an encryption device in accordance with an embodiment of the present invention. As shown in FIG. 1, the encryption device 100 includes a memory control device 110 and a memory array 120. The memory control device 110 includes a first bus interface 111, a controller 112, a buffer 113, a first logic gate 114, a second logic gate 115 and a cryptographic device 130.

The first bus interface 111 receives the operation instruction INS, the write data WDATA and the memory address ADDR from the bus bar BUS, and the first bus interface 111 transmits the operation instruction INS and the memory address ADDR to the controller 112, so that the controller 112 operates the memory array 120 according to the operation instruction INS and the memory address ADDR.

According to an embodiment of the present invention, when the controller 112 performs a write operation on the memory array 120 according to the operation instruction INS, the first logic gate 114 performs an exclusive OR operation on the write data WDATA and the key stream KS to generate the encrypted write data EWDATA. The encrypted write data EWDATA is temporarily stored in the buffer 113 of the controller 112. Next, the controller 112 writes the encrypted write data EWDATA temporarily stored in the buffer 113 into the memory array 120 according to the memory address ADDR.

According to another embodiment of the present invention, when the controller 112 performs a read operation on the memory array 120 according to the operation instruction INS, the controller 112 temporarily stores the encrypted read data ERDATA from the memory address ADDR of the memory array 120 in the buffer 113, and the second logic gate 115 performs an exclusive OR operation on the encrypted read data ERDATA and the key stream KS to generate the read data RDATA, and the read data RDATA is passed through the first bus interface 111 and the bus BUS to the host.

As shown in FIG. 1, the encryption device 130 includes a register 131, a determination unit 132, a first multiplexer 133 and an encryption unit 134. The register 131 is used to store the plural memory addresses of the protection area of the memory array 120, and store the key KEY and the random number NONCE corresponding to each of the plural memory addresses of the protection area.

FIG. 2 shows a mapping table of memory addresses, keys and random numbers in accordance with an embodiment of the present invention. The mapping table 200 records the mapping relationship between the memory address ADDR, the key KEY and the random number NONCE of the protection area. As shown in the embodiment of FIG. 2, the protection area of the memory array 120 includes a first memory address ADDR1, a second memory address ADDR2 . . . and an N-th memory address ADDRN, wherein the first memory address ADDR1 includes the first start address SADDR1 and the first end address EADDR1, the second memory address ADDR2 includes the second start address SADDR2 and the second end address EADDR2, and the N-th memory address ADDRN includes the N-th start address SADDRN and the N-th end address EADDRN.

In other words, when the memory array 120 performs an read operation and/or a write operation on one memory address between the first start address SADDR1 and the first end address EADDR1, between the second start address SADDR2 and the second end address EADDR2 . . . and between the N-th start address SADDRN and the N-th end address EADDRN, the encrypted read data ERDATA must be decrypted and the write data WDATA must be encrypted.

As shown in FIG. 2, each memory address (consisting of the first memory address ADDR1, the second memory address ADDR2 . . . and the N-th memory address ADDRN) has a corresponding first key KEY1, second key KEY2 . . . and N-th key KEYN and a corresponding first random number NONCE1, second random number NONCE2 . . . and N-th random number NONCEN. According to an embodiment of the present invention, the user may set the first memory address ADDR1, the second memory address ADDR2 . . . and the N-th memory address ADDRN through the bus BUS and the first bus interface 111. The user may also set the first random number NONCE1, the second random number NONCE2 . . . and the N-th random number NONCEN stored in the register 131. According to other embodiments of the present invention, the user may set the first key KEY1, the second key KEY2 . . . and the N-th key KEYN stored in the register 131 through the bus BUS and the first bus interface 111.

Returning to FIG. 1, when the determination unit 132 receives the memory address ADDR from the first bus interface 111, the determination unit 132 accesses the mapping table 200 stored in the register 131 to determine whether the memory address ADDR is located in the first memory address ADDR1, the second memory address ADDR2 . . . or the N-th memory address ADDRN of 200 in the mapping table, and the memory address ADDR is provided to the cryptographic unit 134.

According to an embodiment of the present invention, when the determination unit 132 determines that the received memory address ADDR is located in the second memory address ADDR2 of the corresponding table 200, the determination unit 132 generates a determination signal DET, and the first multiplexer 133 selects the second key KEY2 and the second random number NONCE2 corresponding to the second memory address ADDR2 according to the determination signal DET to output.

Next, the encryption unit 134 generates the key stream KS according to the key KEY and the random number NONCE from the first multiplexer 133 and the memory address ADDR from the determination unit 132 by the counter mode (counter mode). According to an embodiment of the present invention, the encryption device 100 is an on-the-fly cryptographic architecture. In other words, when the memory control device 110 operates the memory array 120 according to the operation instruction INS and the memory address ADDR, the encryption device 130 simultaneously generates the key stream KS according to the memory address ADDR.

When accessing the same external memory address ADDR in the real-time password structure of the counter password mode, the input data of the encryption and decryption engine must be the same regardless of the key KEY. Therefore, it is easy for an attacker to encrypt a large amount of input data with a known key to create a power analysis module. Then, let the encryption and decryption engine perform the same input data encryption operation again with the unknown user key, and finally steal the user key by using the previously established power analysis module. Therefore, there is a need for other cryptographic architectures to enhance data protection capabilities.

Figure 3:
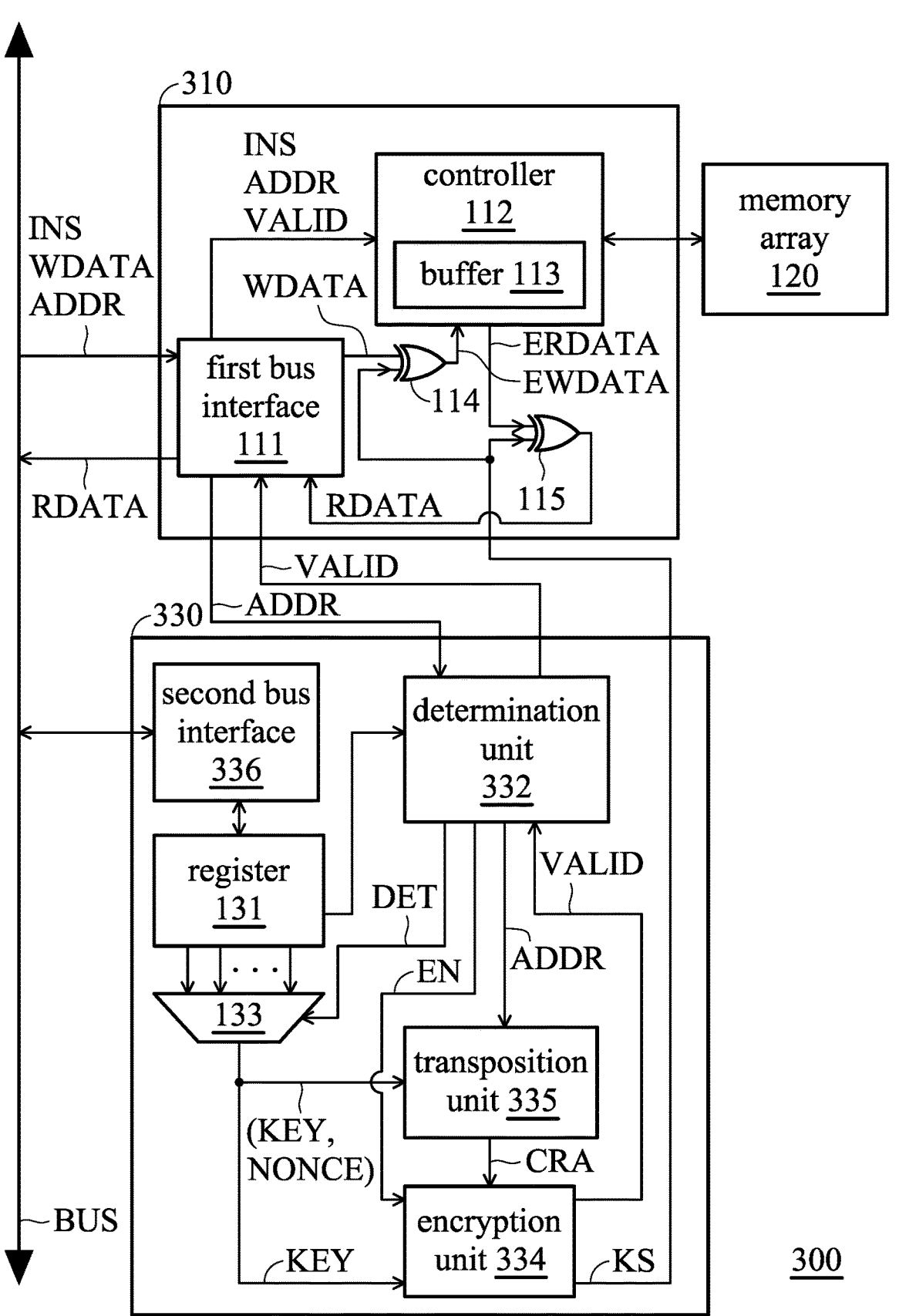
FIG. 3 is a block diagram showing an encryption device in accordance with another embodiment of the present invention.

FIG. 3 is a block diagram showing an encryption device in accordance with another embodiment of the present invention. As shown in FIG. 3, the encryption device 300 includes a memory control device 310, a memory array 120 and an encryption device 330. The memory control device 310 includes a first bus interface 111, a controller 112, a first logic gate 114 and a second logic gate 115, and operates the memory array 120. The first bus interface 111, the controller 112, the first logic gate 114, the second logic gate 115 and the memory array 120 are described in detail in FIG. 1 which will not be repeated herein.

Comparing the encryption device 300 with the encryption device 100 in FIG. 1, the memory control device 310 and the encryption device 330 are independent of each other, and the encryption device 130 in FIG. 1 is located in the memory control device 110. According to an embodiment of the present invention, the encryption device 300 is an on-the-fly cryptographic architecture. In other words, when the memory control device 310 operates the memory array 120 according to the operation instruction INS and the memory address ADDR, the encryption device 330 simultaneously generates the key stream KS according to the memory address ADDR.

According to an embodiment of the present invention, only when the memory address ADDR is located between the first start address SADDR1 and the first end address EADDR1, between the second start address SADDR2 and the second end address EADDR2 . . . or between the N-th start address SADDRN and the N-th end address EADDRN in FIG. 2, the encryption device 330 will be activated.

The encryption device 330 includes a register 131, a determination unit 332, a first multiplexer 133, an encryption unit 334, a transposition unit 335 and a second bus interface 336. The register 131 is the same as the register 131 in FIG. 1, and is used for storing the mapping table 200 of the memory address ADDR, the key KEY, and the random number NONCE, which will not be repeated herein. The determination unit 332 receives the memory address ADDR from the first bus interface 111 and accesses the mapping table 200 of the register 131. The determination unit 332 determines whether the memory address ADDR is located in the first memory address ADDR1, the second memory addresses ADDR2 . . . or the N-th memory address ADDRN.

When the determination unit 332 determines that the memory address ADDR is located in the protection area, the determination unit 332 enables the encryption unit 334 by using the enable signal EN and generates the determination signal DET, so that the multiplexer 133 outputs the key KEY and the random number NONCE corresponding to the memory address ADDR. According to an embodiment of the present invention, when the determination unit 332 determines that the memory address ADDR is located in the second memory address ADDR2 of the corresponding table 200, the determination unit 332 enables the encryption unit 334 and controls the first multiplexer 133 to select the second key KEY2 and the second random number NONCE2 corresponding to the second memory address ADDR2 to be output.

According to another embodiment of the present invention, when the determining unit 132 determines that the memory address ADDR is not among any of the memory addresses (i.e., the first memory address ADDR1, the second memory address ADDR2 . . . and the N-th memory address ADDRN) in the mapping table 200, the determination unit 332 uses the enable signal EN to turn off the encryption unit 334 to reduce power consumption.

The transposition unit 335 generates a binary code CB (not shown in FIG. 3), and, transposes the binary code CB to generate a transposition code CRA according to the key KEY and the memory address ADDR output by the first multiplexer 133. The binary code CB includes the random number NONCE and the memory address ADDR. Next, the encryption unit 334 generates a key stream KS according to the key KEY and the transposition code CRA.

According to an embodiment of the present invention, when the encryption unit 334 generates the key stream KS, the encryption unit 334 simultaneously provides the valid signal VALID to the determination unit 332, and the determination unit 332 provides the valid signal VALID to the controller 112 through the first bus interface 111, so that the controller 112 encrypts the write data WDATA and/or decrypts the encrypted read data ERDATA using the key stream KS.

The user can set the first start address SADDR1 and the first end address EADDR1 of the first memory address ADDR1, and the second start address SADDR2 and the second end address EADDR2 of the second memory address ADDR2 . . . , and the N-th start address SADDRN and the N-th end address EADDRN of the N-th memory address ADDRN of the protection area through the bus BUS and the second bus bar interface 336, and can also set the random number NONCE1, the second random number NONCE2 . . . , and the N-th random number NONCEN of the mapping table 200 stored in the register 131.

According to other embodiments of the present invention, the user can also set the first key KEY1, the second key KEY2 . . . and the N-th key KEYN stored in the register 131 through the bus BUS and the second bus interface 336.

Figure 4:
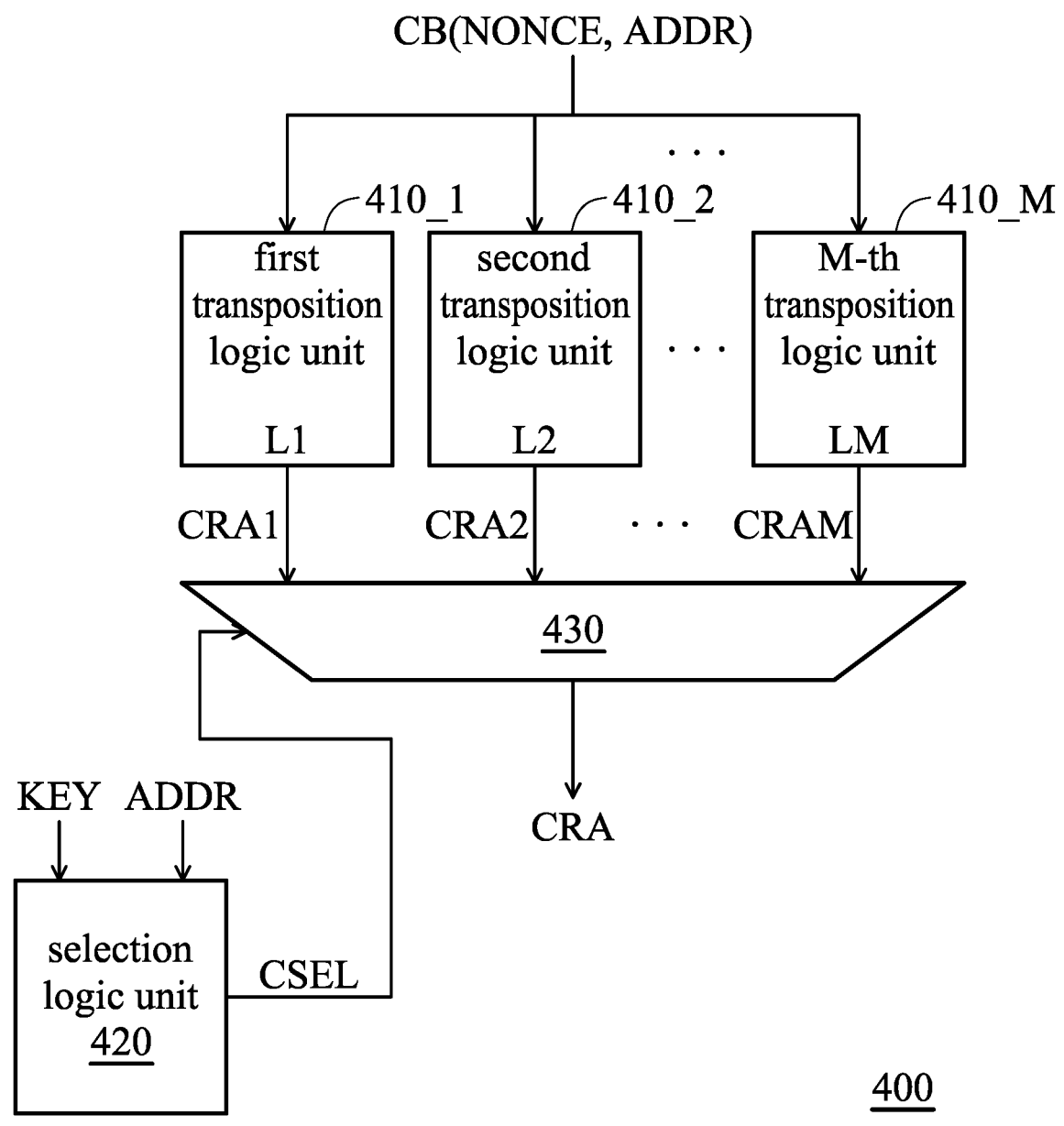
FIG. 4 shows a block diagram of a transposition unit in accordance with an embodiment of the present invention.

FIG. 4 shows a block diagram of a transposition unit in accordance with an embodiment of the present invention. As shown in FIG. 4, the transposition unit 400 includes a first transposition logic unit 410_1, a second transposition logic unit 410_2 . . . , an M-th transposition logic unit 410_M, a selection logic unit 420, and a multiplexer 430 According to an embodiment of the present invention, the binary code CB includes a random number NONCE and a memory address ADDR.

The first transposition logic unit 410_1, the second transposition logic unit 410_2 . . . and the M-th transposition logic unit 410_M each has a respective first transposition logic L1, second transposition logic L2, . . . , and M-th transposition logic LM. Each of the first transposition logic unit 410_1, the second transposition logic unit 410_2 . . . and the M-th transposition logic unit 410_M transpose the binary code CB according to the corresponding transposition logic to generate the first transposition code CRA1, the second transposition code CRA2 . . . and the M-th transposition code CRAM. According to an embodiment of the present invention, the first transposition logic L1, the second transposition logic L2 . . . and the M-th transposition logic LM are different from one another.

The selection logic unit 420 generates the selection code CSEL according to the key KEY and the memory address ADDR. The second multiplexer 430 selects one of the transposition codes (i.e., the first transposition code CRA1, the second transposition code CRA2 . . . and the M-th transposition code CRAM) to output as the transposition code CRA according to the selection code CSEL. According to an embodiment of the present invention, the transposition unit 400 includes a first transposition logic unit 410_1, a second transposition logic unit 410_2 . . . and an M-th transposition logic unit 410_M, and the selection code CSEL is $W=ceil(log_2 M)$ bits. That is, the number of bits of the selection code CSEL is equal to the ceiling integer of $log_2 M$.

Figure 5:
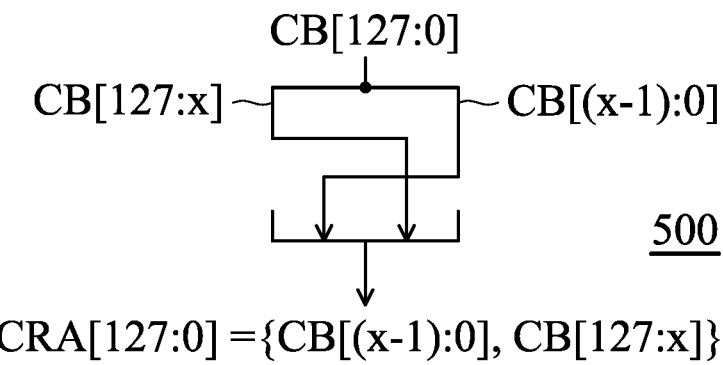
FIG. 5 is a schematic diagram showing transposition logic in accordance with an embodiment of the present invention.

FIG. 5 is a schematic diagram showing transposition logic in accordance with an embodiment of the present invention. As shown in FIG. 5, the transposition logic 500 divides the 128-bit binary code CB into a first part CB[127:x] and a second part CB[(x−1):0], where x is any integer between 127 and 0. In addition, the transposition logic 500 further transposes the order of the first part CB[127:x] and the second part CB[(x−1):0] to generate a transposition code CRA, wherein the order of the first part CB[127:x] and the second part CB[(x−1):0] of the transposition code CRA is different than that of the first part CB[127:x] and the second part CB[(x−1):0] of the binary code CB. According to some embodiments of the present invention, the transposition logic 500 corresponds to the first transposition logic L1, the second transposition logic L2 . . . or the M-th transposition logic LM in FIG. 4.

Figure 6:
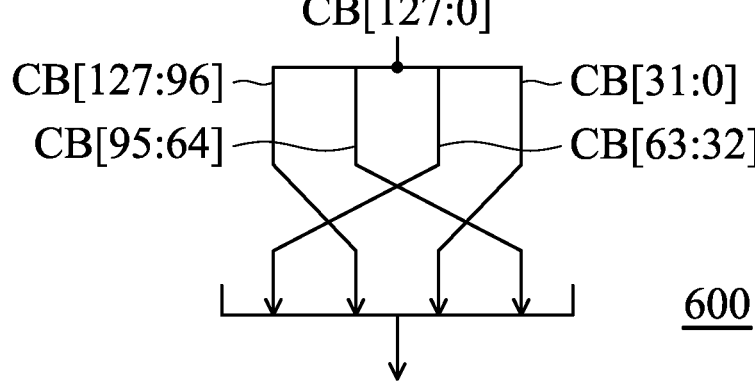
FIG. 6 is a schematic diagram showing the transposition logic in accordance with another embodiment of the present invention.

FIG. 6 is a schematic diagram showing the transposition logic in accordance with another embodiment of the present invention. As shown in FIG. 6, the transposition logic 600 divides every 32 bits of the 128-bit binary code CB into a group to generate the first part CB[31:0] and the second part CB[63:32], the third part CB[95:64] and the fourth part CB[127:96]. In addition, the transposition logic 600 further changes the order of the first part CB[31:0], the second part CB[63:32], the third part CB[95:64] and the fourth part CB[127:96]] to generate a transposition code CRA, wherein the order in the transposition code CRA is the third part CB[95:64], the first part CB[31:0], and the fourth part CB[127]:96] and the second part CB[63:32]. According to some embodiments of the present invention, the transposition logic 600 corresponds to the first transposition logic L1, the second transposition logic L2 . . . or the M-th transposition logic LM in FIG. 4.

Figure 7:
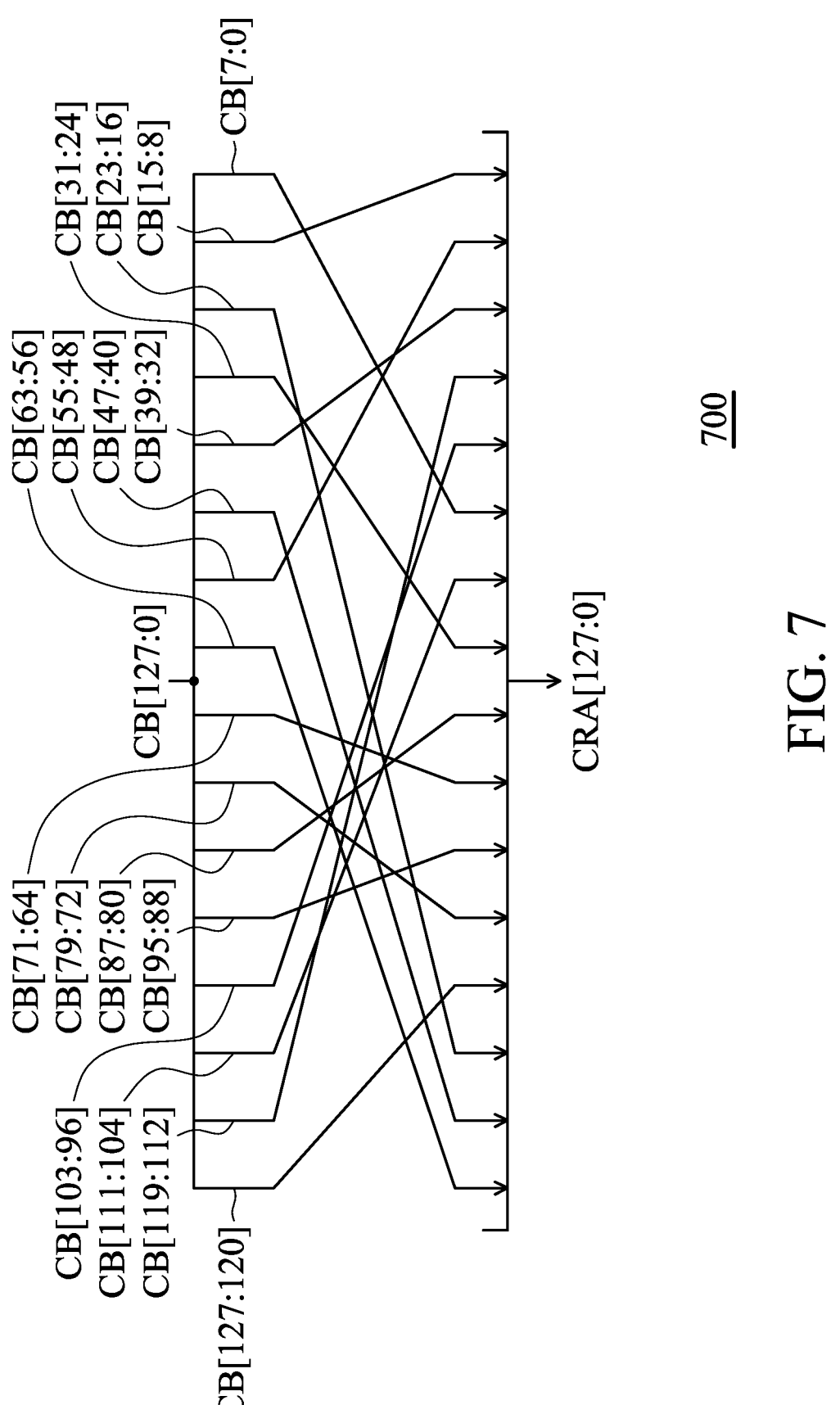
FIG. 7 is a schematic diagram showing transposition logic in accordance with another embodiment of the present invention.

FIG. 7 is a schematic diagram showing transposition logic in accordance with another embodiment of the present invention. As shown in FIG. 7, the transposition logic 700 divides every 8 bits of the 128-bit binary code CB into a group to generate the first part CB[7:0], the second part CB[15:8], the third part CB[23:16], the fourth part CB[31:24], the fifth part CB[39:32], the sixth part CB[47:40], the seventh part CB[55:48], the eighth part CB[63:56], the ninth part CB[71:64], the tenth part CB[79:72], the eleventh part CB[87:80], the twelfth part CB[95:88], the thirteenth part CB[103:96], the fourteenth part CB[111:104], the fifteenth part CB[119:112] and the sixteenth part CB[127:120].

The transposition logic 700 further changes the order of the first part CB[7:0], the second part CB[15:8], the third part CB[23:16], the fourth part CB[31:24], the fifth part CB[39:32], the sixth part CB[47:40], the seventh part CB[55:48], the eighth part CB[63:56], the ninth part CB[71:64], the tenth part CB[79:72], the eleventh part CB[87:80], the twelfth part CB[95:88], the thirteenth part CB[103:96], the fourteenth part CB[111:104], the fifteenth part CB[119:112] and the sixteenth part CB[127:120] to generate transposition code CRA. According to some embodiments of the present invention, the transposition logic 700 corresponds to the first transposition logic L1, the second transposition logic L2 . . . or the M-th transposition logic LM in FIG. 4.

According to other embodiments of the present invention, the transposition unit 400 divides the binary code CB into at least a first part and a second part according to transposition logic, and reverses the order of the first part and the second part to generate a transposition code CRA, where the number of bits in the first part and the second part may be the same or different.

Figure 8:
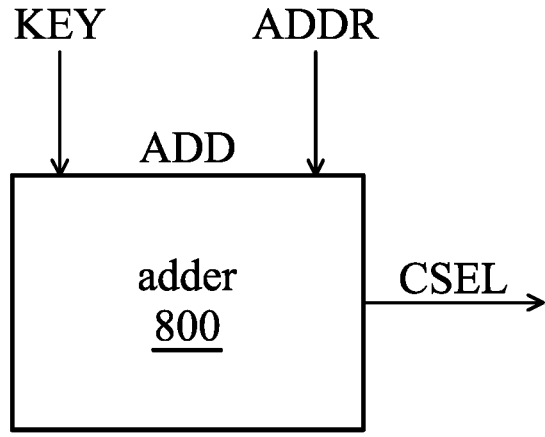
FIG. 8 is a schematic diagram showing a selection logic unit in accordance with an embodiment of the present invention.

FIG. 8 is a schematic diagram showing a selection logic unit in accordance with an embodiment of the present invention. According to an embodiment of the present invention, the selection logic unit 420 of FIG. 4 is the adder 800. As shown in FIG. 8, the adder 800 performs the addition operation ADD on each bit of the key KEY and the corresponding bit of the memory address ADDR to generate the selection code CSEL. According to some embodiments of the present invention, the key KEY and the memory address ADDR are M bits, and the selection code CSEL is W (where, W=⌈log₂ M⌉) bits, for selecting one of the transposition codes, which consist of the first transposition code CRA1, the second transposition code CRA2 . . . and the M*th transposition code CRAM, to output as the transposition code CRA.

Figure 9:
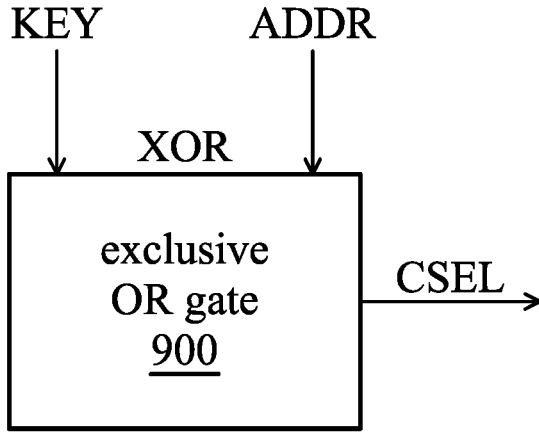
FIG. 9 is a schematic diagram showing a selection logic unit in accordance with another embodiment of the present invention.

FIG. 9 is a schematic diagram showing a selection logic unit in accordance with another embodiment of the present invention. According to another embodiment of the present invention, the selection logic unit 420 of FIG. 4 is an exclusive OR gate 900. As shown in FIG. 9, the exclusive OR gate 900 performs a mutually exclusive OR operation XOR on each bit of the key KEY and the corresponding bit of the memory address ADDR to generate a selection code CSEL. According to some embodiments of the present invention, the selection logic unit 900 corresponds to the selection logic unit 420 in FIG. 4, the key KEY and the memory address ADDR are M bits, and the selection code CSEL is W (wherein W=⌈log₂ M⌉) bit for selecting the first transposition code CRA1, the second transposition code CRA2 . . . or the M-th transposition code CRAM as transposition code CRA.

According to an embodiment of the present invention, the selection logic unit 420 in FIG. 4 may perform operations on each bit of the key KEY and the corresponding bit of the memory address ADDR to generate a selection code CSEL by using an addition operation, an exclusive OR operation, and combinations thereof to select the first transposition code CRA1, the second transposition code CRA2 . . . or the M-th transposition code CRAM as the transposition code CRA.

Figure 10:
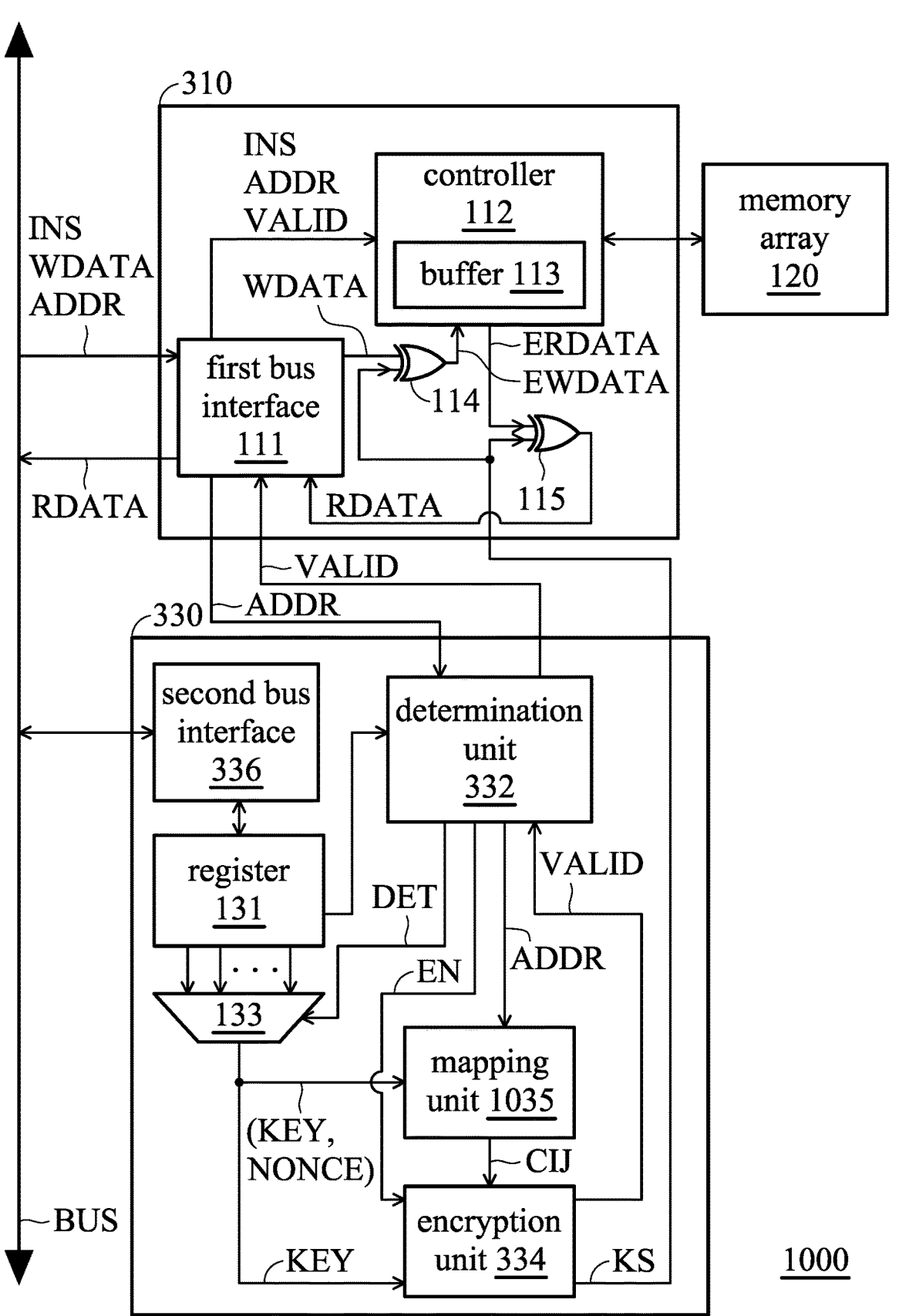
FIG. 10 is a block diagram showing an encryption device in accordance with another embodiment of the present invention.

FIG. 10 is a block diagram showing an encryption device in accordance with another embodiment of the present invention. Comparing the encryption device 1000 with the encryption device 300 in FIG. 3, the transposition unit 335 of the encryption device 300 is replaced by the mapping unit 1035. As shown in FIG. 10, the mapping unit 1035 generates a binary code CB (not shown in FIG. 10), and maps the key KEY, the address ADDR, and the binary code CB, which is output by the first multiplexer 133 and corresponding to the memory address ADDR, to the injection code CIJ according to an injection function, where the binary code CB includes the random number NONCE and the memory address ADDR.

Figure 11:
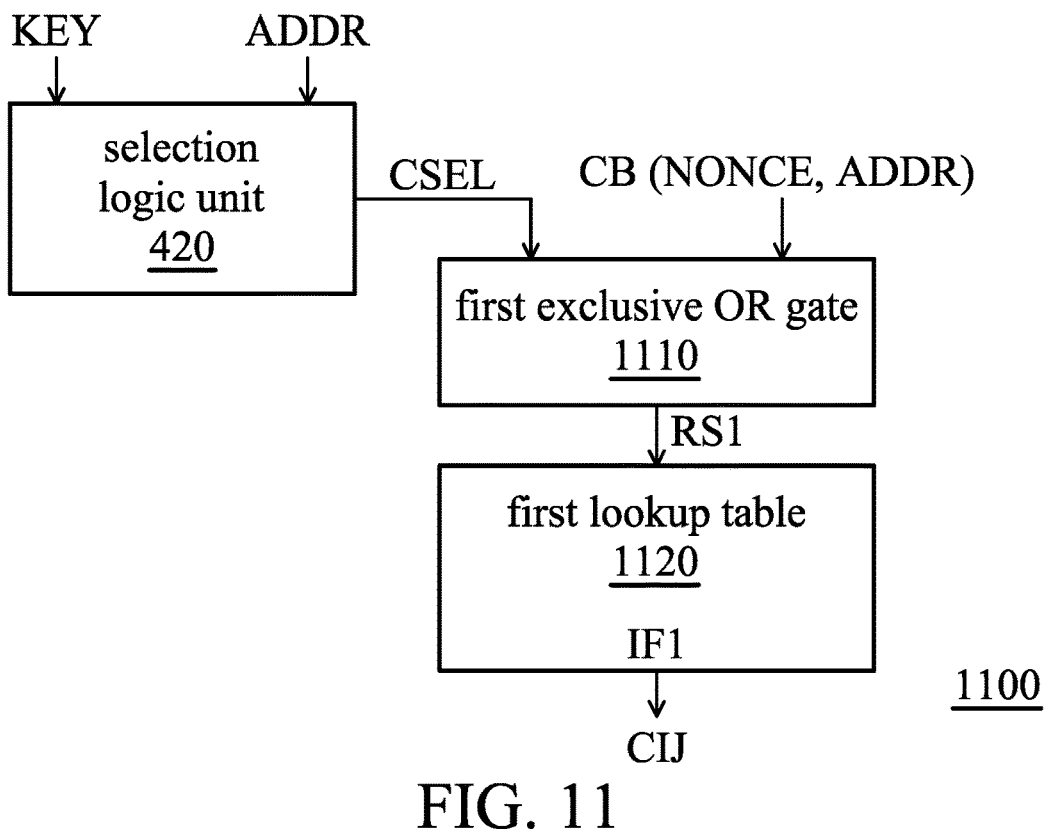
FIG. 11 shows a block diagram of a mapping unit in accordance with an embodiment of the present invention.

FIG. 11 shows a block diagram of a mapping unit in accordance with an embodiment of the present invention. As shown in FIG. 11, the mapping unit 1100 includes a selection logic unit 420, a first exclusive OR gate 1110 and a first lookup table 1120. The selection logic unit 420 generates the selection code CSEL according to the key KEY and the memory address ADDR. According to some embodiments of the present invention, the selection logic unit 420 may be implemented by the adder 800 in FIG. 8 or the exclusive OR gate 900 in FIG. 9, which will not be repeated herein.

The first exclusive OR gate 1110 performs an exclusive OR operation on each bit of the selection code CSEL and the binary code CB to generate a first result RS1. The first lookup table 1120 has a first injection function IF1, and the first lookup table 1120 maps the first result RS1 to the injection code CIJ based on the first injection function IF1. According to an embodiment of the present invention, the first injection function IF1 is a 1-to-1 mapping function for mapping the single first result RS1 to the injection code CIJ.

Figure 12:
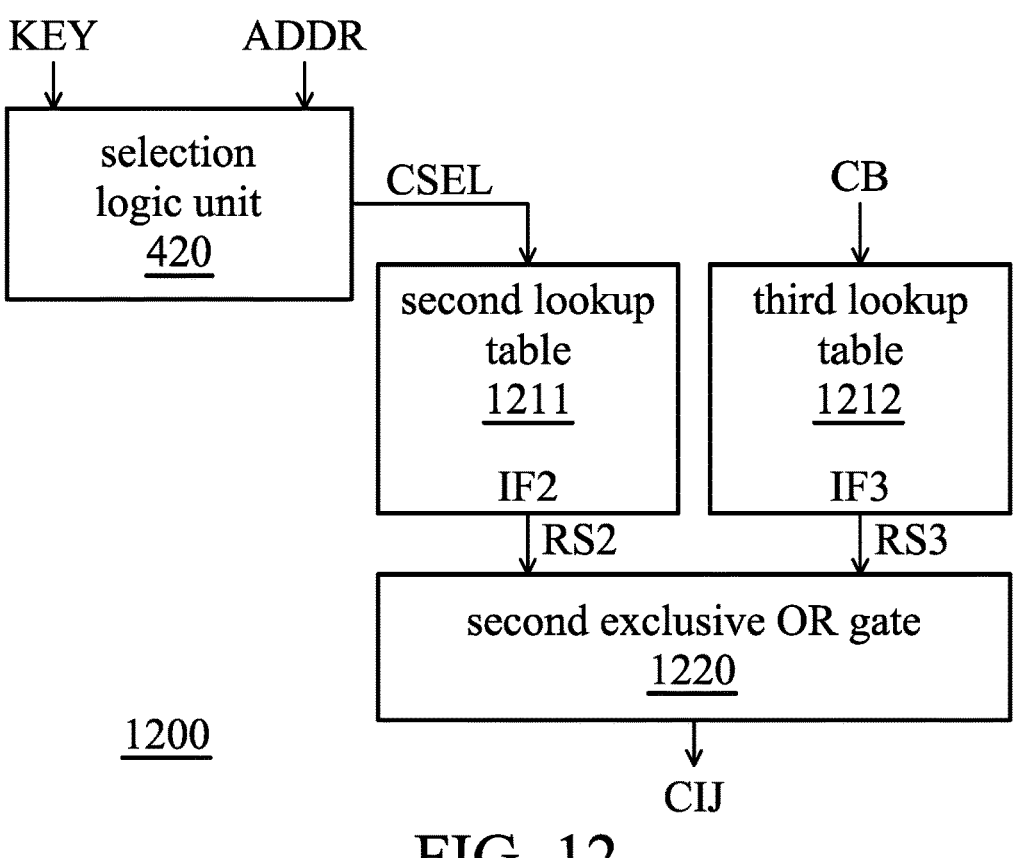
FIG. 12 is a block diagram showing a mapping unit in accordance with another embodiment of the present invention.

FIG. 12 is a block diagram showing a mapping unit in accordance with another embodiment of the present invention. As shown in FIG. 12, the mapping unit 1200 includes a selection logic unit 420, a second lookup table 1211, a third lookup table 1212, and a second exclusive OR gate 1220. The selection logic unit 420 generates the selection code CSEL according to the key KEY and the memory address ADDR. According to some embodiments of the present invention, the selection logic unit 420 may be implemented by the adder 800 in FIG. 8 or the exclusive OR gate 900 in FIG. 9, which will not be repeated herein.

The second look-up table 1211 has the second injection function IF2, and the second look-up table 1211 maps the selection code CSEL to the second result RS2 based on the second injection function IF2. The third lookup table 1212 has a third injection function IF3, and the third lookup table 1212 maps the binary code CB to the third result RS3 based on the third injection function IF3. According to an embodiment of the present invention, the second injection function IF2 and the third injection function IF3 are both 1-to-1 mapping functions for respectively mapping the single selection code CSEL and the binary code CB to the single second result RS2 And the third result RS3. The second exclusive OR gate 1220 performs an exclusive OR operation on each bit of the second result RS2 and the third result RS3 to generate the injection code CIJ.

Figure 13:
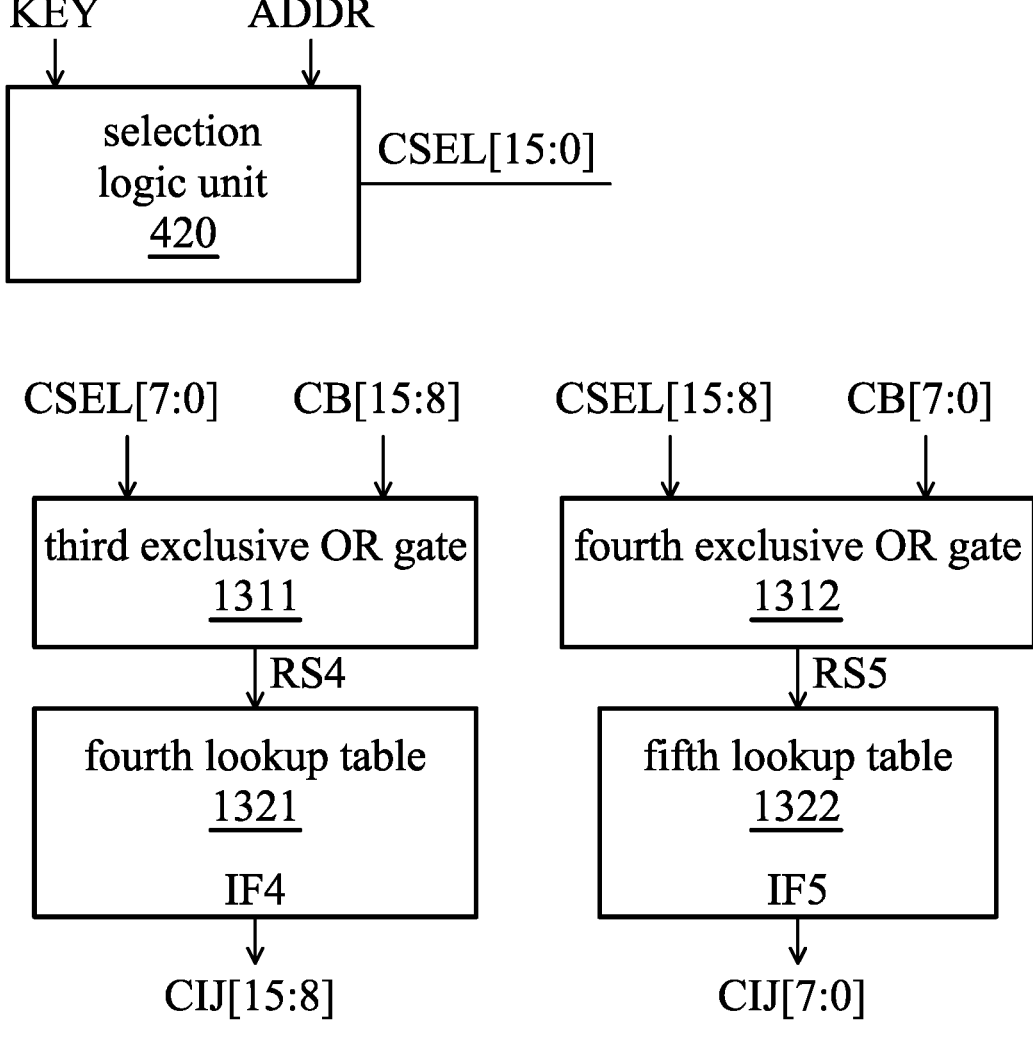
FIG. 13 is a block diagram showing a mapping unit in accordance with another embodiment of the present invention.

FIG. 13 is a block diagram showing a mapping unit in accordance with another embodiment of the present invention. As shown in FIG. 13, the mapping unit 1300 includes a selection logic unit 420, a third exclusive OR gate 1311, a fourth exclusive OR gate 1312, a fourth lookup table 1321 and a fifth lookup table 1322. The selection logic unit 420 generates selection codes CSEL[15:0] according to the key KEY and the memory address ADDR. The following description takes the 16-bit selection code CSEL[15:0] and the binary code CB[15:0] as examples for explanation, but it is not intended to be limited thereto.

The binary code CB[15:0] is divided into the first part CB[7:0] and the second part CB[15:8], and the selection code CSEL[15:0] is divided into the first part selection code CSEL[7:0] and the second part selection code CSEL[15:8]. The first exclusive OR gate 1311 performs an exclusive OR operation on each bit of the second part CB[15:8] and the first part selection code CSEL[7:0] to generate a fourth result RS4. The second exclusive OR gate 1312 performs an exclusive OR operation on each bit of the first part CB[7:0] and the second part selection code CSEL[15:8] to generate a fifth result RS5.

The fourth lookup table 1321 has a fourth injection function IF4, and the fourth lookup table 1321 maps the fourth result RS4 to the first part injection code CIJ[15:8] based on the fourth injection function IF4. The fifth lookup table 1322 has a fifth injection function IF5, and the fifth lookup table 1322 maps the fifth result RS5 to the second part injection code CIJ[7:0] based on the fifth injection function IF5, where the injection code CIJ in FIG. 10 is composed of the first part injection code CIJ[15:8] and the second part injection code CIJ[7:0]. According to an embodiment of the present invention, the fourth injection function IF4 and the fifth injection function IF5 are both 1-to-1 mapping functions for respectively mapping the single fourth result RS4 and the fifth result RS5 to the single first part injection code CIJ[15:8] and the second part injection code CIJ[7:0].

Figure 14:
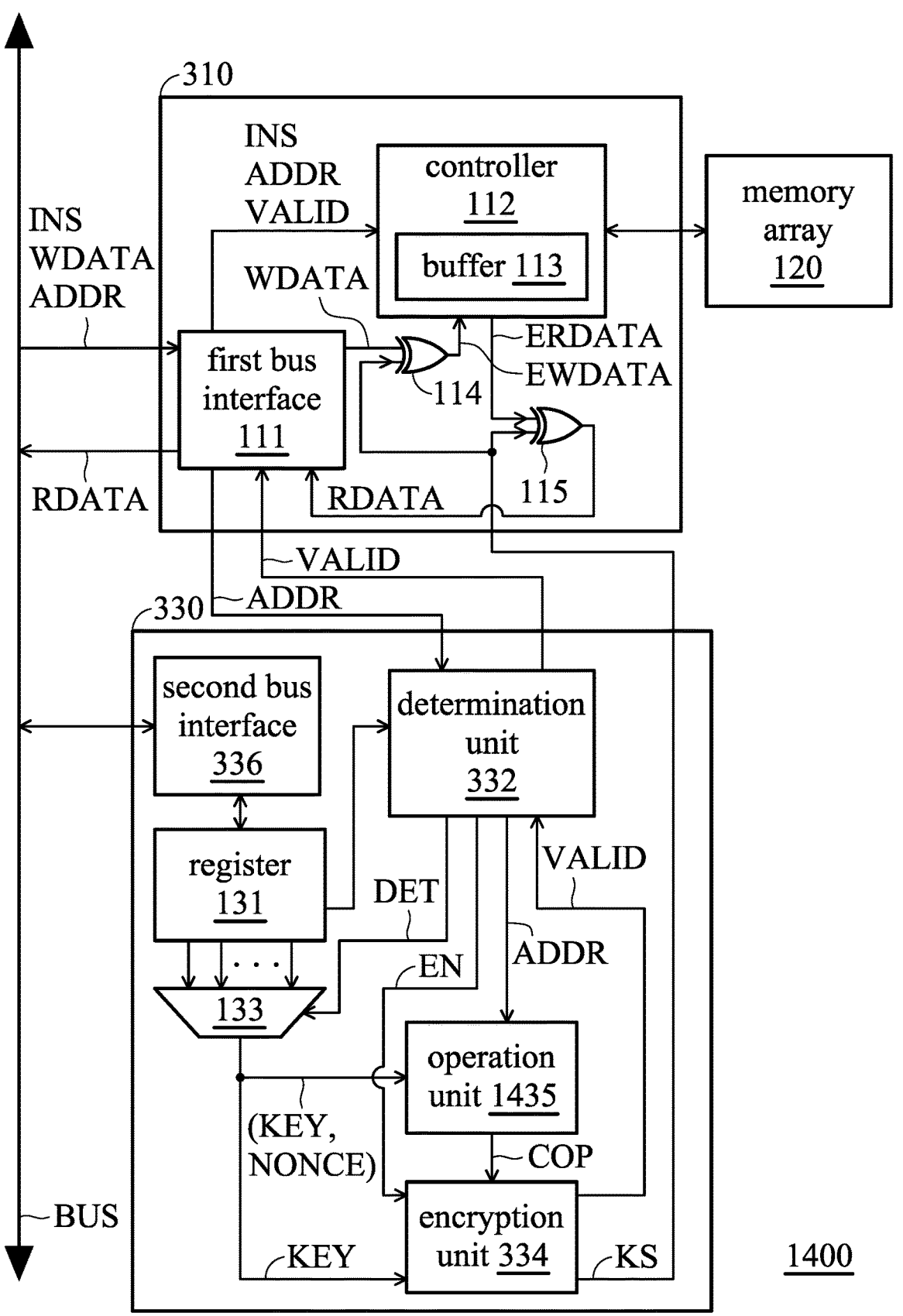
FIG. 14 is a block diagram showing an encryption device in accordance with another embodiment of the present invention.

FIG. 14 is a block diagram showing an encryption device in accordance with another embodiment of the present invention. Comparing the encryption device 1400 with the encryption device 300 in FIG. 3, the transposition unit 335 of the encryption device 300 is replaced by the operation unit 1435. As shown in FIG. 14, the operation unit 1435 generates a binary code CB (not shown in FIG. 14), and performs the binary code CB according to the key KEY and the memory address ADDR from the first multiplexer 133 to generate the operation code COP, where binary code CB includes random number NONCE and memory address ADDR.

Figure 15:
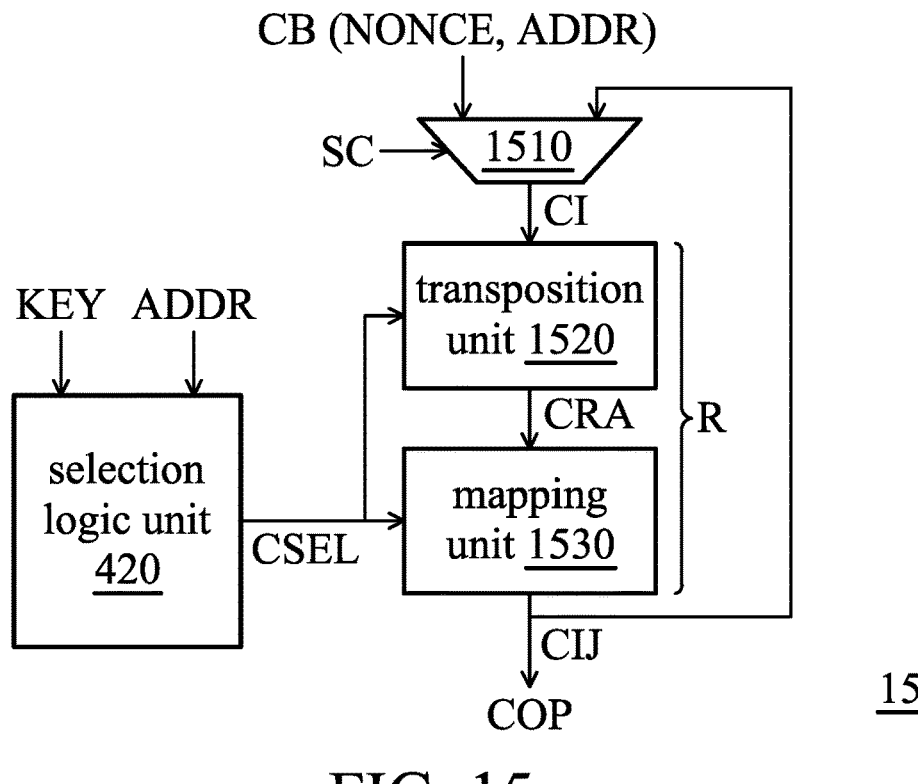
FIG. 15 is a block diagram showing an operation unit in accordance with an embodiment of the present invention.

FIG. 15 is a block diagram showing an operation unit in accordance with an embodiment of the present invention. As shown in FIG. 15, the operation unit 1500 includes a selection logic unit 420, a third multiplexer 1510, a transposition unit 1520 and a mapping unit 1530. The selection logic unit 420 generates the selection code CSEL according to the key KEY and the memory address ADDR. According to some embodiments of the present invention, the selection logic unit 420 may be implemented by the adder 800 in FIG. 8 or the exclusive OR gate 900 in FIG. 9, which will not be repeated herein.

The third multiplexer 1510 selects the binary code CB or the injection code CIJ to output as the input code CI according to the control signal SC. The transposition unit 1520 selects one of transposition logics according to the selection code CSEL, and transposes the input code CI according to the selected transposition logic to generate the transposition code CRA. According to some embodiments of the present invention, the transposition logic of the transposition unit 1520 is shown in FIGS. 5-7, and details are not repeated herein. The mapping unit 1530 maps the selection code CSEL and the transposition code CRA to the injection code CIJ according to the injection function.

According to some embodiments of the present invention, the mapping unit 1530 is shown in FIGS. 11-13, and details are not repeated herein. According to an embodiment of the present invention, the control signal SC can be used to control the repeated execution times R of the transposition unit 1520 and the mapping unit 1530. After the execution times R are completed, the injection code CIJ output by the mapping unit 1530 is output as the operation code COP.

Figure 16:
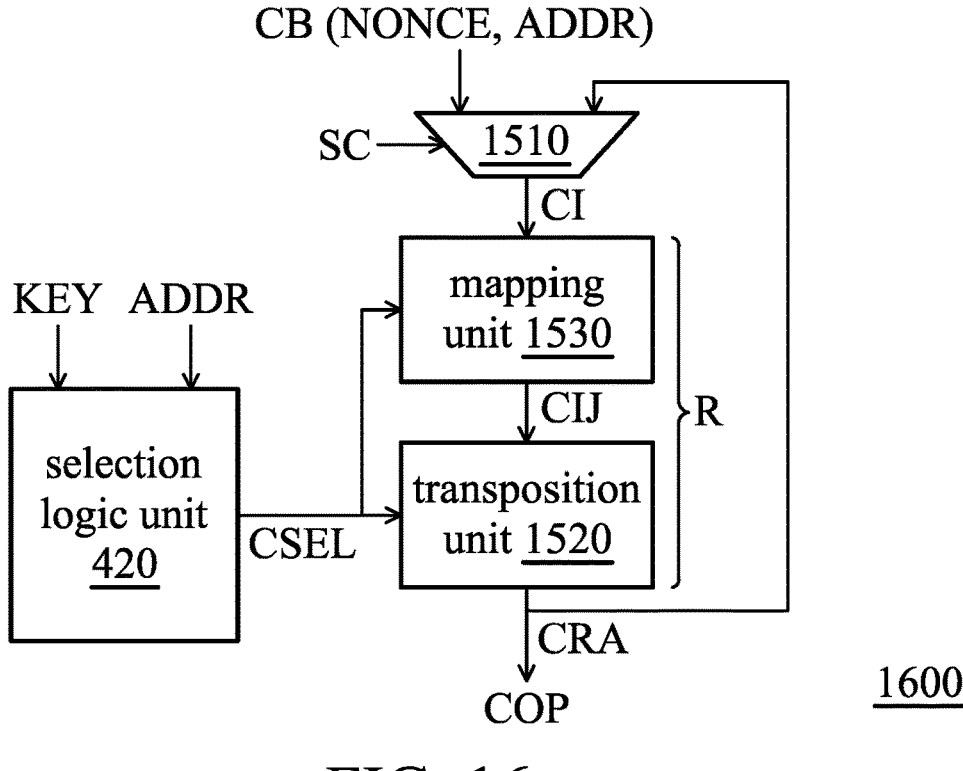
FIG. 16 is a block diagram showing an arithmetic unit in accordance with another embodiment of the present invention.

FIG. 16 is a block diagram showing an arithmetic unit in accordance with another embodiment of the present invention. Comparing the operation unit 1600 with the operation unit 1500 in FIG. 15, the order of the transposition unit 1520 and the mapping unit 1530 is changed. In other words, the mapping unit 1530 maps the input code CI to the injection code CIJ according to the selection code CSEL, and the transposition unit 1520 transposes the injection code CIJ according to the selection code CSEL to generate the transposition code CRA. According to an embodiment of the present invention, the control signal SC can be used to control the repeated execution times R of the mapping unit 1530 and the transposition unit 1520, and after the execution times R are completed, the transposition code CRA output by the transposition unit 1520 is output as an operation code COP.

Figure 17:
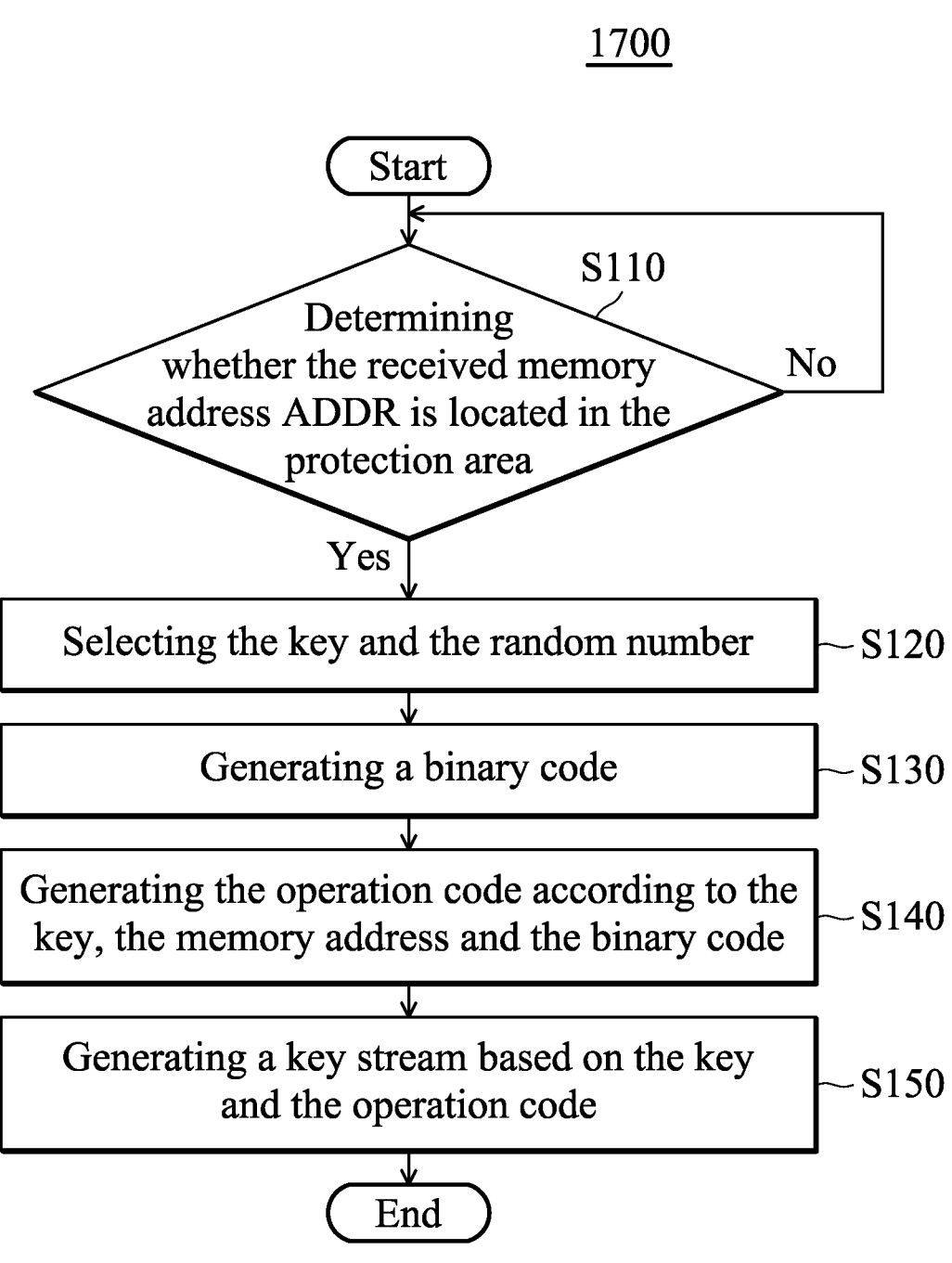
FIG. 17 is a flowchart showing a cryptographic method in accordance with an embodiment of the present invention.

FIG. 17 is a flowchart showing a cryptographic method in accordance with an embodiment of the present invention. In the following, the encryption method 1700 of FIG. 17 will be combined with FIGS. 3-7 and FIGS. 10-16 for the convenience of detailed description.

By using the determination unit 332, it is determined whether the received memory address ADDR is located in the protection area (Step S110). When it is determined that the memory address ADDR is located in the protected area, the key KEY and the random number NONCE are selected by the determining unit 332 (Step S120). When it is determined that the memory address ADDR is not in the protection area, Step S110 is returned. According to an embodiment of the present invention, when it is determined that the memory address ADDR is located in the protected area, the determination unit 332 selects the key KEY and the random number NONCE corresponding to the memory address ADDR according to the mapping table 200 stored in register 131.

Next, the transposition unit 335 is utilized to generate a binary code CB (Step S130), where the binary code CB includes a random number NONCE and a memory address ADDR. In addition, by using the transposition unit 335, the operation code COP is generated according to the key KEY, the memory address ADDR and the binary code CB (Step S140). Next, the encryption unit 334 generates a key stream KS based on the key KEY and the operation code COP (Step S150).

According to one embodiment of the present invention, the transposition unit 400 of FIG. 4 transposes the binary code CB according to the transposition logic 500 of FIG. 5, the transposition logic 600 of FIG. 6 and the transposition logic 700 of FIG. 7 to generate the transposition code CRA, and the cryptographic unit 334 in FIG. 3 generates the key stream KS according to the key KEY and the transposition code CRA, where the operation code COP in Step S140 is the transposition code CRA herein.

According to another embodiment of the present invention, the mapping unit 1100 in FIG. 11, the transposition unit 1200 in FIG. 12, and the transposition unit 1300 in FIG. 13 maps the selection code CSEL and the binary code CB, which are generated by the key KEY and the memory address ADDR, to the injection code CIJ, and the cryptographic unit 334 in FIG. 10 generates the key stream KS according to the key KEY and the injection code CIJ, where the operation code COP of Step S140 is the injection code CIJ herein.

According to another embodiment of the present invention, the operation unit 1500 in FIG. 15 and the operation unit 1600 in FIG. 16 performs the execution times R of transpositions and mappings on the selection code CSEL and/or the binary code CB generated by the selection logic unit 420 to generate the operation code COP, and the cryptographic unit 334 of FIG. 14 generates the key stream KS according to the key KEY and the operation code COP.

The present invention provides a cryptographic device and a cryptographic method thereof, which are configured to generate a key stream in real time when the memory control device operates the memory array. Compared with the counter encryption mode, the encryption device and encryption method proposed by the present invention utilize different input data encoding methods, so that the attacker will face higher difficulties in establishing the power analysis module, thereby providing better data protection capability.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A cryptographic method for a memory array, comprising:

storing the start address and the end address of the memory address of the protection area, the key corresponding to the memory address of the protection area, and the random number in a register, wherein a user sets the key and the random number that correspond to the memory address of the protection area stored in the register through a bus interface;

determining that a memory address is located in the protection area to select a key and a random number;

when it is determined that the memory address is located in the protection area, selecting the key and the random number corresponding to the memory address from the register;

generating a binary code, wherein the binary code comprises the random number and the memory address;

generating an operation code according to the key, the memory address, and the binary code; and generating a key stream according to the key and the operation code.

2. The cryptographic method as defined in claim 1, further comprising:

reading encrypted read data from a memory array and/or writing write data into the memory array according to the memory address and an operation instruction; and decrypting the encrypted read data and encrypting the write data using the key stream.

3. The cryptographic method as defined in claim 1, wherein the step of generating the operation code according to the key, the memory address and the binary code further comprises:

generating a selection code according to the key and the memory address;

performing an exclusive OR operation on the selection code and the binary code to generate a first result; and mapping the first result to the operation code based on an injection function.

4. The cryptographic method as defined in claim 1, wherein the step of generating the injection code according to the key, the memory address and the binary code further comprises:

generating a selection code according to the key and the memory address;

mapping the selection code to a first result based on a first injection function;

mapping the binary code to a second result based on a second injection function; and performing an exclusive OR operation on the first result and the second result to generate the operation code.

5. The cryptographic method as defined in claim 1, wherein the step of generating the operation code according to the key, the memory address and the binary code further comprises:

generating a selection code according to the key and the memory address;

dividing the selection code into a first part and a second part;

dividing the binary code into a third part and a fourth part;

performing an exclusive OR operation on the first part and the third part to generate a first result;

performing the exclusive OR operation on the second part and the fourth part to generate a second result;

mapping the first result to a first injection code based on a first injection function;

mapping the second result to a second injection code based on a second injection function; and combining the first injection code and the second injection code to generate the operation code.

6. The cryptographic method as defined in claim 5, wherein the step of generating the selection code according to the key and the memory address further comprises:

performing an addition operation on each bit of the key and the corresponding bit of the memory address to generate the selection code.

7. The cryptographic method as defined in claim 5, wherein the step of generating the selection code according to the key and the memory address further comprises:

performing an exclusive OR operation on each bit of the key and the corresponding bit of the memory address to generate the selection code.

8. The cryptographic method as defined in claim 1, wherein the step of generating the operation code according to the key, the memory address and the binary code further comprises:

generating a selection code according to the key and the memory address;

selecting a transposition logic according to the selection code;

selecting either the binary code or the operation code to output as an input code;

transposing the input code based on the transposition logic to generate a transposition code; and mapping the selection code and the transposition code to the operation code based on an injection function.

9. The cryptographic method as defined in claim 1, wherein the step of generating the operation code according to the key, the memory address, and the binary code further comprises:

generating a selection code according to the key and the memory address;

selecting a transposition logic according to the selection code;

selecting either the binary code or a transposition code to output as an input code;

mapping the selection code and the input code to an injection code based on an injection function; and transposing the injection code to generate the operation code based on the transposition logic.

* * * * *